United States Patent [19]
Pinto

[11] Patent Number: 4,814,156
[45] Date of Patent: Mar. 21, 1989

[54] NITROGEN PRODUCTION

[75] Inventor: Alwyn Pinto, Middlesbrough, United Kingdom

[73] Assignee: Imperial Chemical Industries PLC, London, England

[21] Appl. No.: 241,810

[22] Filed: Sep. 7, 1988

Related U.S. Application Data

[63] Continuation of Ser. No. 86,601, Aug. 18, 1987, abandoned.

[30] Foreign Application Priority Data

Aug. 27, 1986 [GB] United Kingdom ................ 8620686

[51] Int. Cl.⁴ ............................................. C01B 3/02
[52] U.S. Cl. ..................................... 423/351; 423/437
[58] Field of Search ...................... 423/359, 351, 437

[56] References Cited

U.S. PATENT DOCUMENTS

| | | | |
|---|---|---|---|
| 4,414,191 | 11/1983 | Fuderer | 423/359 |
| 4,553,981 | 11/1985 | Fuderer | 423/652 |
| 4,592,860 | 6/1986 | Fuderer | 252/376 |
| 4,733,528 | 3/1988 | Pinto | 252/376 |

FOREIGN PATENT DOCUMENTS 157480 10/1985 European Pat. Off. .
0204478 12/1986 European Pat. Off. .

*Primary Examiner*—John Doll
*Assistant Examiner*—Wayne A. Langel
*Attorney, Agent, or Firm*—Cushman, Darby & Cushman

[57] ABSTRACT

Production of a nitrogen gas stream from the waste gas from a pressure adsorption process separating a raw gas stream containing nitrogen, carbon dioxide, and combustible gas including hydrogen, into a hydrogen containing product stream and a waste gas stream containing carbon dioxide, some combustible gas, and at least some of the nitrogen, by catalytically combusting the waste gas stream with an oxygen containing gas and removing water from the combusted waste gas stream. Carbon dioxide is removed from the waste gas stream before and/or after catalytic combustion. To reduce the residual oxygen content of the combusted waste gas stream, a small amount of hydrogen, e.g. a portion of the hydrogen containing product from the pressure swing adsorption, may be added to the combusted waste gas stream and the mixture catalytically reacted.

8 Claims, 1 Drawing Sheet

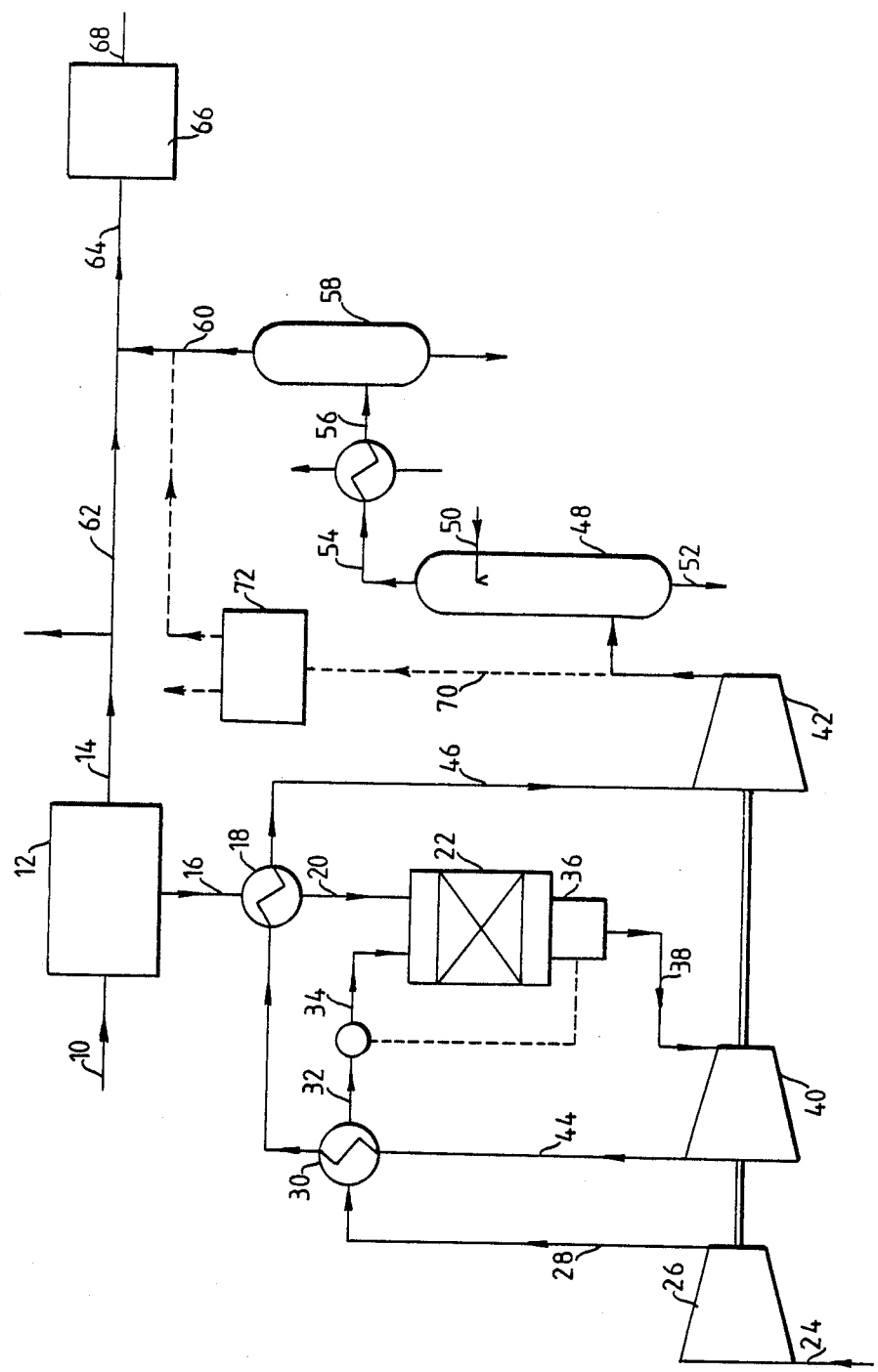

NITROGEN PRODUCTION

This is a continuation of application Ser. No. 086,601, filed Aug. 18, 1987 which was abandoned upon the filing hereof.

This invention relates to the production of streams of nitrogen having a relatively high purity so that the gas is suitable for use, for example, as an inert blanketing gas.

In EP-A-157480 we describe the production of a gas stream suitable for use as ammonia synthesis gas by a pressure swing adsorption (PSA) process from a raw gas stream containing hydrogen, nitrogen (in an excess of the proportion required in the ammonia synthesis gas), and carbon dioxide, and generally also small amounts of methane, carbon monoxide, and/or argon.

This pressure swing adsorption process gives
 (a) a product gas stream, suitable for use as the ammonia synthesis gas and containing hydrogen and nitrogen in the desired molar ratio, normally about 3 moles of hydrogen to 1 mole of nitrogen, and also, perhaps, small quantities of carbon oxides, argon, and/or methane, and
 (b) a waste gas stream containing essentially all the carbon dioxide, the excess of nitrogen, and, generally, a little hydrogen, and some or all of the other components of the raw gas stream.

A somewhat similar process giving a technical hydrogen product gas stream is described in EP-A-204478. Again the waste gas stream contains carbon oxides, nitrogen, a little hydrogen, and also perhaps small quantities of argon and/or methane.

It has been proposed in those references to recover the fuel value from the waste gas stream by using the waste gas as a fuel: in particular, in the aforesaid EP-A-204478 it is suggested that the waste gas can be combusted catalytically, optionally after removal of carbon dioxide, for example, by a "wet" process.

We have now realised that catalytic combustion of such a PSA waste gas stream enables a stream of nitrogen of relatively high purity to be obtained with minimal further processing.

Accordingly the present invention provides a process for the production of a nitrogen gas stream comprising
 (a) separating, by pressure swing adsorption, a raw gas stream containing nitrogen, carbon dioxide, and combustible gas including hydrogen, into a first product stream containing at least hydrogen and a waste gas stream containing carbon dioxide, at least some of the nitrogen, and some combustible gas;
 (b) catalytically combusting the waste gas stream with an oxygen containing gas, the quantity of the latter being just sufficient to ensure complete combustion;
 (c) removing carbon dioxide from the gas stream before and/or after combustion; and
 (d) separating water from the gas stream leaving the catalytic combustion.

The sole FIGURE of the Drawing provides a flowsheet illustrating one embodiment of the invention comprising the catalytic combustion of a PSA waste gas stream enabling a stream of nitrogen of relatively high purity to be obtained with minimal further processing.

The waste gas stream will, as mentioned above, often contain a small amount of hydrogen and, often, small amounts of other combustible gases such as carbon monoxide and methane. The waste gas may also contain inert gases such as argon. Typically the waste gas stream will have the following composition (on a dry basis):
 hydrogen 2–30% v/v
 nitrogen 25–75% v/v
 carbon dioxide 1–60% v/v
 carbon monoxide 0–20% v/v
 methane 0–25% v/v
 argon 0–5% v/v Generally the waste gas stream will contain 5–55%, usually 5–25%, v/v (on a dry basis) of combustible gas.

Catalytic combustion enables the combustible gases to be converted substantially completely to combustion products such as water and/or carbon dioxide which are readily separated from the combusted waste gas, for example by cooling, absorption of carbon dioxide by a suitable absorbent, and/or membrane technology, leaving a gas stream consisting essentially of nitrogen. As described hereinafter, in some cases where there is a carbon dioxide removal step prior to combustion and some carbon dioxide can be tolerated in the nitrogen product stream, it may not be necessary to subject the combusted gas stream to a carbon dioxide removal step.

While the techniques employed to separate water and carbon dioxide from the combusted waste gas stream will generally not effect removal of oxygen, by the use of catalytic combustion it is possible to control the amount of oxygen containing gas, which is conveniently air, used in the combustion so that the residual oxygen content of the combusted waste gas stream leaving the catalytic combustion zone is small, typically less than about 0.1% by volume on a dry basis. If such proportions of oxygen can not be tolerated in the product nitrogen stream, then it is possible to reduce the oxygen content by a suitable catalytic process, e.g. a de-oxo process wherein a small, controlled, amount of hydrogen is added to the combusted waste gas stream, before or after separation of water and any carbon dioxide present, and the mixture passed over a suitable precious metal catalyst effective to cause the hydrogen to react with said residual oxygen. Where the PSA product stream is essentially hydrogen, or a hydrogen/nitrogen mixture, a small proportion thereof can be used as the source of hydrogen employed in such a de-oxo process.

Where the nitrogen in the raw gas stream is derived from air, and/or where air is used as the oxygen containing gas in the catalytic combustion, the combusted waste gas stream will contain a small proportion of argon. Normally the techniques employed to separate water and carbon dioxide from the combusted waste gas will not effect separation of argon: however the presence of such proportions of argon in the resultant nitrogen stream can normally be tolerated.

The catalytic combustion is effected by passing the PSA waste gas, optionally after removal of carbon dioxide therefrom by a "wet" process, and the oxygen containing gas at a suitable pressure, normally in the range 1 to 10 bar abs., over a catalyst such as a supported platinum group metal. The catalyst is preferably supported on a monolithic honeycomb support of, for example, alumina. The oxygen containing gas and/or the PSA waste gas may be saturated with water vapour prior to passage over the catalyst. Energy may be recovered from the gas stream leaving the combustion zone by using the gas stream to drive a turbine, which may in turn drive one or more machines employed in the overall process, e.g. compressors for the oxygen containing gas and/or waste gas, if compression of the latter is necessary, and/or a compressor employed in the production of the raw gas or used in the further processing of the PSA product or separated carbon dioxide e.g. where the latter is employed for urea manufacture. Alternatively such a turbine may be used to drive an alternator producing electricity. Energy may also be recovered from the gas stream leaving the combustion zone by heat exchange, e.g. preheating the PSA waste gas and/or oxygen containing gas prior to passage over the combustion catalyst, producing steam or hot water, and/or preheating one or more reactants employed in the production of the raw gas stream.

Carbon dioxide may be separated from the PSA waste gas, and/or from the combusted waste gas, stream by contact with a suitable absorbent liquid, such as an aqueous solution of potassium carbonate, methyl diethanolamine, triethanolamine, tetramethylene sulphone, methanol, N-methyl pyrrolidone, propylene carbonate, or polyethylene glycol dialkyl ethers.

By the process of the invention it is possible to obtain nitrogen gas streams containing, on a dry basis, at least 80%, and, where there is a carbon dioxide removal step after combustion, at least 90%, particularly at least 95%, by volume of nitrogen.

Referring to the accompanying drawing, a raw gas stream, typically at a pressure of 30 bar abs. and containing hydrogen, nitrogen, carbon dioxide, carbon monoxide, methane, and argon is fed, via line 10, to a pressure swing adsorption (PSA) system 12 of the type described in the aforesaid EP-A-157480. In the PSA system 12 the raw gas is separated into an unadsorbed product gas stream 14 containing hydrogen, nitrogen, some of the argon and traces of carbon oxides and which, after methanation, is suitable for use as ammonia synthesis gas, and a waste gas stream 16. The waste gas stream 16 contains a small proportion of hydrogen, nitrogen, carbon dioxide, carbon monoxide, methane, and some of the argon.

The waste gas stream 16 is typically at a pressure of 3.5 bar abs. The waste gas stream is then preheated in heat exchanger 18, typically to about 300° C., and then fed, via line 20, to a catalytic combustor 22. Air is fed, via line 24, to a compressor 26 and thence, via line 28, to a heat exchanger 30 wherein it is preheated, typically to about 300° to 350° C. The preheated air is then fed, via line 32, to the catalytic combustor 22. The amount of air fed to combustor 22 is controlled by a valve 34 in line 32.

In the catalytic combustor 22 the air and PSA waste gas mix and pass over a combustion catalyst of platinum supported on an alumina honeycomb. Located in the outlet of the catalytic combustor 22 is an oxygen sensor 36 controlling the valve 34 so that the amount of air fed to the combustor 22 is such that there is substantially complete combustion of the PSA waste gas but only a small content of oxygen in the gas stream leaving the combustor 22. The gas leaving the combustor 22 thus consists essentially of nitrogen, carbon dioxide, water vapour and argon.

The combusted gas leaves the catalytic combustor 22, typically at a temperature of about 800°–1000° C., via line 38 and is let down, typically to about 1.2 bar abs., in a turbine 40 driving the air compressor 26 and a compressor 42, and is then fed, via line 44 to heat exchangers 30 and 18 where it provides the source of heat for preheating the PSA waste gas and the combustion air.

The temperature of the combusted gas leaving the catalytic combustor is controlled at the desired level by varying the degree of preheating of the waste gas stream and/or the air by controlled bypass (not shown) of heat exchangers 18 and/or 30. Alternatively, or additionally, the combustor exit temperature is controlled by the incorporation of steam into the air and/or waste gas stream fed to the combustor. Such steam may be incorporated by direct injection or by means of a saturator wherein the air and/or waste gas stream is contacted with a stream of hot water.

The combusted gas stream, cooled by passage through the heat exchangers 30 and 18, is then passed, via line 46, to compressor 42, where it is compressed typically to about 3.6 bar abs. If necessary the combusted gas may be further cooled, by a suitable cooler, not shown, before and/or after compressor 42. A heat exchanger (not shown) may be provided in series or parallel with heat exchangers 18 and 30 to generate a hot water stream, e.g. that required for any saturation as aforesaid, or to raise steam, e.g. for direct injection as aforesaid, or for export.

The compressed gas is then fed to a carbon dioxide absorption column 48 wherein it contacts a suitable absorbent liquid fed to the top of the column 48 via line 50. Carbon dioxide loaded absorbent is removed from the base of the column 48 via line 52 and is passed to a regeneration column (not shown) from which regenerated absorbent is recycled to the top of column 48. The combusted gas stream, from which the carbon dioxide has been absorbed, is fed from the top of column 48, via line 54 and a cooler 56, to a catchpot 58 to remove condensed water to give a nitrogen stream 60. If desired, particularly where steam has been added, directly or by saturation, to the air and/or waste gas stream prior to combustion, a cooler and catchpot (not shown) may be provided in line 46 to condense any excess of steam and to separate condensed water prior to compression.

If it is desired to reduce the oxygen content of the nitrogen stream 60, a small part stream 62 is taken from the unadsorbed PSA product stream 14, before or after methanation, and mixed with the nitrogen stream 60. The mixture is then fed, via line 64, through a de-oxo unit 66 containing a precious metal de-oxo catalyst, to give a purified nitrogen stream 68.

Typical flow rates of the components of the gas streams for a calculated example of the above process are shown in the following table.

| Stream | Flow rate (kg mol/hr) | | | | | | | |
|---|---|---|---|---|---|---|---|---|
| | $O_2$ | $H_2$ | $N_2$ | $CO_2$ | CO | $CH_4$ | Ar | $H_2O$ |
| 10 | — | 4781.0 | 2568.8 | 1437.6 | 27.5 | 42.4 | 59.2 | — |
| 14 | — | 4436.4 | 1423.1 | — | 8.9 | 11.9 | 32.7 | — |
| 16 | — | 344.6 | 1145.7 | 1437.6 | 18.6 | 30.5 | 26.5 | — |
| 32 | 244.7 | — | 909.9 | 0.4 | — | — | 10.7 | 11.7 |
| 38 | 2.1 | — | 2055.6 | 1487.1 | — | — | 37.2 | 417.3 |
| 60 | 2.1 | — | 2055.6 | 2.1 | — | — | 37.2 | 25.5 |
| 64 | 2.1 | 4.2 | 2056.9 | 2.1 | <0.1 | <0.1 | 37.2 | — |
| 68 | — | — | 2056.9 | 2.1 | — | — | 37.2 | 29.7 |

To remove the residual water, the purified nitrogen stream 68 may be dried in conventional manner, for example by means of a molecular sieve adsorbent.

In an alternative arrangement, the compressed gas stream from compressor 42 may be fed via line 70 (shown dotted) to a membrane separator unit 72 wherein the nitrogen, and some of the argon and oxygen, is separated from the carbon dioxide and water as the nitrogen stream 60.

In an alternative embodiment, most, e.g. 75% or more, of the carbon dioxide is removed from the waste gas stream 16 prior to feeding the waste gas to the catalytic combustor 22. The removal of the carbon dioxide may be effected by contacting the waste gas with a suitable absorbent liquid as aforesaid. Where the absorbent liquid is aqueous, the resulting gas stream fed to the catalytic combustor will be saturated with water. However it will normally be necessary to add a further quantity of steam to act as a ballast in the catalytic combustion to moderate the temperature thereof. This additional steam may be added by direct injection or by saturation as aforesaid.

This alternative is particularly advantageous where the nitrogen product is not required at an elevated pressure and some carbon dioxide can be tolerated in the nitrogen product as then the re-compression in compressor 42 and the subsequent carbon dioxide removal stage can be omitted. Thus in the above example, if 80% of the carbon dioxide is removed prior to combustion, and there is no re-compression and carbon dioxide removal after combustion, the product nitrogen, at a pressure of 1.2 bar abs., contains will contain about 85% nitrogen and about 14% carbon dioxide on a dry basis.

This alternative wherein carbon dioxide is removed prior to combustion is also advantageous where re-compression of the combusted gas and removal of carbon dioxide therefrom is effected, since the excess of steam added as ballast can be condensed prior to compression, thereby reducing the quantity of gas that has to be compressed, and hence reducing the power consumption required for compression. Thus in the above example, if 80% of the carbon dioxide is removed prior to combustion and the combusted gas cooled to about 50° C. and the condensed steam is removed prior to re-compression, the amount of gas that has to be re-compressed is only about 68% of that of the corresponding case where there was no carbon dioxide removal prior to combustion.

Where there is two-stage carbon dioxide removal, i.e. removal of some carbon dioxide prior to combustion of the waste gas and then removal of carbon dioxide from the combusted gas after re-compression thereof, the carbon dioxide removal may be effected by a liquid absorbent by contacting the combusted gas with regenerated absorbent to provide an absorbent part loaded with carbon dioxide and combusted gas of low carbon dioxide content, and contacting the waste gas with the part loaded absorbent to provide a loaded absorbent, which is passed to a regenerator to regenerate the absorbent, and a waste gas from which the carbon dioxide has been partially removed. Alternatively the removal of carbon dioxide, if required, from the combusted gas may be effected by an independent system, which may be for example a membrane separation unit.

I claim:

1. A process for the production of a nitrogen gas stream comprising:
   (a) separating, by pressure swing adsorption, a raw gas stream containing nitrogen, carbon dioxide, and combustible gas including hydrogen, into a first product stream containing at least hydrogen and a waste gas stream containing carbon dioxide, at least some of the nitrogen, and some combustible gas;
   (b) catalytically combusting the waste gas stream with an oxygen containing gas, the quantity of the latter being just sufficient to ensure complete combustion;
   (c) recovering energy from the combusted waste gas by using the latter to drive a turbine;
   (d) compressing the combusted waste gas after passage through the turbine by a compressor driven by the turbine; and
   (e) removing carbon dioxide and water from the combusted waste gas stream after the compression thereof.

2. A process according to claim 1 wherein the combustible gas in the raw gas stream comprises methane and/or carbon monoxide as well as hydrogen, and the pressure swing adsorption effects separation of at least some of said methane and/or carbon monoxide into said waste gas.

3. A process according to claim 1 wherein the amount of oxygen containing gas employed in the catalytic combustion is controlled such that the oxygen content of the gas stream leaving the catalytic combustion is less than 0.1% by volume on a dry basis.

4. A process according to claim 1 wherein the combusted waste gas stream contains residual oxygen, hydrogen is added to the combusted waste gas stream, and the resultant mixture is passed over a catalyst effective to cause the hydrogen to react with said residual oxygen.

5. A process according to claim 4 wherein the product gas stream separated by pressure swing adsorption is hydrogen, or a hydrogen/nitrogen mixture, and a portion thereof is added to said combusted waste gas stream to provide the hydrogen required for reaction with the residual oxygen.

6. A process according to claim 1 wherein separation of carbon dioxide from the combusted waste gas stream is effected by contact with a liquid effective to absorb carbon dioxide.

7. A process according to claim 1 wherein the waste gas stream has the composition (on a dry basis):
   hydrogen: 2–30% v/v
   nitrogen: 25–75% v/v
   carbon dioxide: 1–60% v/v
   carbon monoxide: 0–20% v/v
   methane: 0–25% v/v
   argon: 0–5% v/v.

8. A process according to claim 1 wherein the waste gas stream contains 5–55% v/v (on a dry basis) of combustible gas.

* * * * *